Nov. 6, 1951 R. M. M. OBERMAN 2,574,224
CIRCUIT FOR MARKING A LINE AS BUSY
Filed July 30, 1947
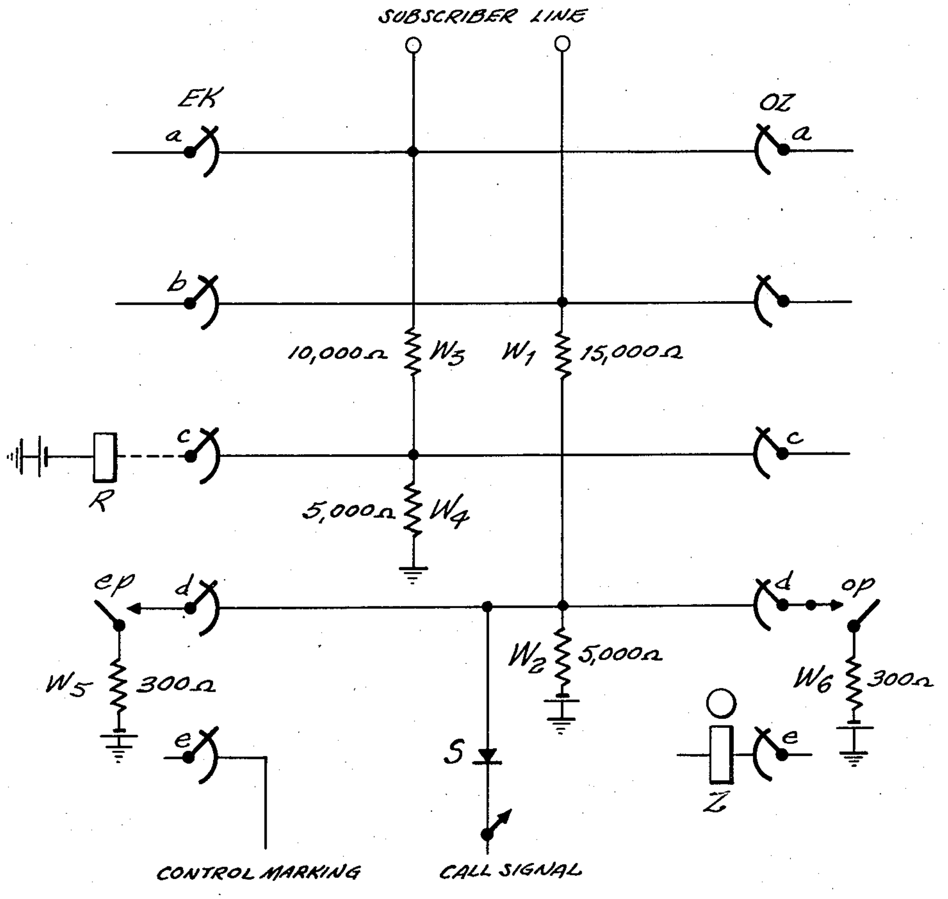
INVENTOR.
Roelof M. M. Oberman
BY
[signature]

Patented Nov. 6, 1951 2,574,224

UNITED STATES PATENT OFFICE 2,574,224

CIRCUIT FOR MARKING A LINE AS BUSY

Roelof M. M. Oberman, The Hague, Netherlands

Application July 30, 1947, Serial No. 767,529
In the Netherlands September 3, 1945

Section 1, Public Law 690, August 8, 1946
Patent expires September 3, 1965

10 Claims. (Cl. 179—16)

The invention relates to a circuit for marking a line as busy, and is to be used in a signalling system in particular a telegraph or telephone system in which connections are built up over selectors or finders.

In the usual signalling systems a line, after a call has been made, is not immediately marked as busy, and thus can be seized from other directions. Consequently, undesired connections may be established.

The delay in marking a subscriber line as busy after the telemicrophone has been lifted depends mainly on the nature of the automatic telephone system concerned, and varies between the operating time of the line relay armature and the time taken by the register to find back the calling subscriber by means of the cord finder and the call finders. The delay in busying is particularly considerable in systems in which the selector and finder control is entirely concentrated in the register. Consequently, a subscriber to a private branch exchange seizing for instance, a line to the town exchange may, while still awaiting dialing tone, be connected in undesired manner with a town subscriber who had just then seized the line concerned from the other end. This phenomenon may always occur on bidirectional traffic lines.

The circuit of the present invention avoids the above mentioned drawbacks by connecting the line circuit wire on which the busy test is made to a tap on the call detecting circuit, so that a call made by a loop closure immediately effects a voltage shift on the tap indicating the busy condition of the line.

The invention will be described in detail with reference to the accompanying drawing showing a line circuit of an automatic system without line and cut-off relays. It will be understood however, that the invention may also be applied to systems with line and cut-off relays.

Referring now to the drawing, the line circuit extends from —battery over resistances or resistors W1 and W2, the subscriber's loop, the resistances or resistors W3 and W4 to ground. EK is the final selector and OZ a first line finder. Both include wipers *a*—*e* and corresponding sets of contacts of which the sets *a*—*d* are connected to the corresponding wires of the line circuit. The *d*-wire is connected over resistance or resistor $W_2$ to —battery, the *c*-wire over resistance or resistor $W_4$ to ground.

When the telemicrophone is at rest on the set (not shown) the *d*-wire has the potential of —battery and the *c*-wire of ground. When the telemicrophone is lifted, the *d*-wire receives negative potential to such extent that the call detector common to a number of subscribers and indicated by the line marked "Call Signal" is actuated, whereas the *c*-wire receives a negative voltage.

The busy test of a subscriber line is carried out on the *c*-wire of the final selector, preferably in such a manner that the subscriber's line is tested free when the *c*-wire of the line circuit is at ground or at the slight negative potential due to possible line leak, whereas the line is tested busy when the *c*-wire shows a higher negative voltage with maximal admissible line leak.

By way of example some resistance or resistor values have been indicated in the drawing.

On closing the subscriber's loop the *c*-wire has a potential of about —5 volts. If the insulation resistance between the subscriber's wires is about 60,000 ohms, the *c*-wire will have —2½ volts when the telemicrophone is on the hook. Therefore, test voltages for free and busy condition should be divided by this value.

It should be understood that the line circuit is marked busy after seizure by a final selector through the winding of a control relay R connected to —battery. This circuit is usually extended to the winding of another relay, e. g. in the connecting circuit, during the call in view of the possibility of offering a call and disconnecting. The talking circuit is made symmetrical from an A. C. standpoint during the call as the line circuit wire is connected with —battery via one of the low resistances W5 or W6 respectively, for a called and for a calling subscriber.

The circuit of the invention may also be used for the supervision of a line connecting two exchanges.

While I have illustrated and described what I regard as the preferred embodiment of my invention, nevertheless it will be understood that such is merely exemplary, and that numerous modifications and rearrangements may be made therein without departing in any way from the spirit of my invention.

What I claim as new, and desire to secure by Letters Patent is:

1. In an exchange for telecommunication having a final selector, in combination, a D. C. voltage source; two terminals of a subscriber's line; a first pair of resistances connected in series between one of said two terminals and one pole of said voltage source; a second pair of resistances connected in series between the other of said two terminals and the other pole of said voltage sources; a first arch and a second arch in the final selector; a connection between said first arch of the final selector and the junction of said first pair of resistances; a connection between said second arch of the final selector and the junction of said second pair of resistances; and a rectifying device connected to the junction of said second pair of resistances; said rectifying device connecting the junction of said second pair of resistances to a line finder starting device.

2. In an exchange for telecommunication having a line finder and a final selector, having a plurality of arches connected in pairs, in combination, a D. C. voltage source; two terminals of a subscriber's line; a first pair of resistances connected in series between one of said two terminals and one pole of said voltage source; a second pair of resistances connected in series between the other of said two terminals and the other pole of said voltage source; a first arch and a second arch in the final selector; a first arch and a second arch in the line finder connected, respectively, to said first arch and said second arch in the final selector; a connection between said first arch of the final selector and the junction of said first pair of resistances; a connection between said second arch of the final selector and the junction of said second pair of resistances; and a rectifying device connected to the junction of said second pair of resistances; said rectifying device connecting the junction of said second pair of resistances to a line finder starting device.

3. In an exchange for telecommunication having a line finder and a final selector having a plurality of arches connected in pairs, in combination, a D. C. voltage source; two terminals of a subscriber's line; a first pair of resistances connected in series between one of said two terminals and one pole of said voltage source; a second pair of resistances connected in series between the other of said two terminals and the other pole of said voltage source; a first arch and a second arch in the final selector; a first arch and a second arch in the line finder connected, respectively, to said first arch and said second arch in the final selector; a connection between said first arch of the final selector and the junction of said first pair of resistances; a first wiper in the final selector arranged for cooperation with said first arch of the final selector; a resistance connected between said first wiper and the other pole of said voltage source; a connection between said second arches of the line finder and the final selector and the junction of said second pair of resistances; a second wiper in the final selector arranged for cooperation with said second arch of the final selector; a resistance connected between said second wiper of the final selector and the other pole of said voltage source; a third wiper in the line finder arranged for cooperation with said second arch of the line finder; a resistance connected between that third wiper of the line finder and the other pole of said voltage source; and a rectifying device connected to the junction of said second pair of resistances; said rectifying device connecting the junction of said second pair of resistances to a line finder starting device.

4. In an exchange for telecommunication having a final selector, in combination, a D. C. voltage source; a subscriber's line having a first terminal and a second terminal; a first wire connected to said first terminal; a second wire connected to said second terminal; a first pair of resistors connected in series between said first wire and one pole of said voltage source; a second pair of resistors connected in series between said second wire and the other pole of said voltage source; a first arch and a second arch in the final selector; a connection between said first arch of the final selector and the junction of said first pair of resistors; and a connection between said second arch of the final selector and the junction of said second pair of resistors.

5. In an exchange for telecommunication having a final selector, in combination, a D. C. voltage source; a subscriber's line having a first terminal and a second terminal; a first wire connected to said first terminal; a second wire connected to said second terminal; a first pair of resistors connected in series between said first wire and one pole of said voltage source; a second pair of resistors connected in series between said second wire and the other pole of said voltage source; a first arch and a second arch in the final selector; a connection between said first arch of the final selector and the junction of said first pair of resistors; a wiper in the final selector arranged for cooperation with said first arch of the final selector; a resistance connected between said wiper and the other pole of said voltage source; and a connection between said second arch of the final selector and the junction of said second pair of resistors.

6. In an exchange for telecommunication having a line finder and a final selector having a plurality of arches connected in pairs, in combination, a D. C. voltage source; a subscriber's line having a first terminal and a second terminal; a first wire connected to said first terminal; a second wire connected to said second terminal; a first pair of resistors connected in series between said first wire and one pole of said voltage source; a second pair of resistors connected in series between said second wire and the other pole of said voltage source; a first arch and a second arch in the final selector; a first arch and a second arch in the line finder connected, respectively, to said first arch and said second arch in the final selector; a connection between said first arch of the final selector and the junction of said first pair of resistors; and a connection between said second arch of the final selector and the junction of said second pair of resistors.

7. In an exchange for telecommunication having a line finger and a final selector having a plurality of arches connected in pairs, in combination, a D. C. voltage source; a subscriber's line having a first terminal and a second terminal; a first wire connected to said first terminal; a second wire connected to said second terminal; a first pair of resistors connected in series between said first wire and one pole of said voltage source; a second pair of resistors connected in series between said second wire and the other pole of said voltage source; a first arch and a second arch in the final selector; a first arch and a second arch in the line finder connected, respectively, to said first arch and said second arch in the final selector; a connection between said first arch of the final selector and the junction of said first pair of resistors; a connection between said second arches of the line finder and of the final selector and the junction of said second pair of resistors; a wiper in the line finder arranged for cooperation with said second arch of the line finder; and a resistance connected between said wiper in the line finder and the other pole of said voltage source.

8. In an exchange for telecommunication having a line finder and a final selector, having a plurality of arches connected in pairs, in combination, a D. C. voltage source; a subscriber's line having a first terminal and a second terminal; a first wire connected to said first terminal; a second wire connected to said second terminal; a first pair of resistors connected in series between said first wire and one pole of said voltage source; a second pair of resistors connected in series between said second wire and the other pole of said voltage source; a first arch and a second arch in the final selector; a first arch and a second arch in the line finder connected, respectively, to said first arch and said second arch in the final selector; a connection between said first arch of the final selector and the junction of said first pair of resistors; a first wiper in the final selector arranged for cooperation with said first arch of the final selector; a first resistance connected between said first wiper and the other pole of said voltage source; a connection between said second arches of the line finder and the final selector and the junction of said second pair of resistors; a second wiper in the line finder arranged for cooperation with said second arch of the line finder; and a second resistance connected between said second wiper of the line finder and the other pole of said voltage source.

9. In an exchange for telecommunication having a line finder and a final selector, having a plurality of arches connected in pairs, in combination, a D. C. voltage source; a subscriber's line having a first terminal and a second terminal; a first wire connected to said first terminal; a second wire connected to said second terminal; a first pair of resistors connected in series between said first wire and one pole of said voltage source; a second pair of resistors connected in series between said second wire and the other pole of said voltage source; a first arch and a second arch in the final selector; a first arch and a second arch in the line finder connected, respectively, to said first arch and said second arch in the final selector; a connection between said first arch of the final selector and the junction of said first pair of resistors; a first wiper in the final selector arranged for cooperation with said first arch of the final selector; a first resistance connected between said first wiper and the other pole of said voltage source; a connection between said second arches of the line finder and the final selector and the junction of said second pair of resistors; a second wiper in the final selector arranged for cooperation with said second arch of the final selector; a second resistance connected between said second wiper of the final selector and the other pole of said voltage source; a third wiper in the line finder arranged for cooperation with said second arch of the line finder; and a third resistance connected between said third wiper of the line finder and the other pole of said voltage source.

10. In an exchange for telecommunication having a switch, in combination, a D. C. voltage source; two terminals of a subscriber's line; a first pair of resistances connected in series between one of said two terminals and one pole of said voltage source; a second pair of resistances connected in series between the other of said two terminals and the other pole of said voltage sources; a first arch and a second arch in the switch; a connection between said first arch of the switch and the junction of said first pair of resistances; a connection between said second arch of the switch and the junction of said second pair of resistances; and a rectifying device connected to the junction of said second pair of resistances, said rectifying device connecting the junction of said second pair of resistances to a line finder starting device.

ROELOF M. M. OBERMAN.

REFERENCES CITED

The following references are of record in the file of this patent:

UNITED STATES PATENTS

| Number | Name | Date |
|---|---|---|
| Re. 22,475 | McDavitt | May 9, 1944 |
| 1,560,725 | Powell | Nov. 10, 1925 |
| 1,723,524 | Rosa | Aug. 6, 1929 |
| 2,312,427 | Lomax | Mar. 2, 1943 |
| 2,322,864 | McCarthy | June 29, 1943 |